US008133293B2

(12) United States Patent
Smith

(10) Patent No.: US 8,133,293 B2
(45) Date of Patent: Mar. 13, 2012

(54) AIR CLEANER BOATTAIL

(75) Inventor: Jeffrey P. Smith, Prosper, TX (US)

(73) Assignee: PACCAR Inc, Bellevue, WA (US)

( * ) Notice: Subject to any disclaimer, the term of this patent is extended or adjusted under 35 U.S.C. 154(b) by 384 days.

(21) Appl. No.: 12/399,834

(22) Filed: Mar. 6, 2009

(65) Prior Publication Data

US 2010/0223894 A1 Sep. 9, 2010

(51) Int. Cl.
*B01D 46/00* (2006.01)

(52) U.S. Cl. ......... 55/385.3; 55/413; 55/418; 123/198 E

(58) Field of Classification Search ................. 55/385.3, 55/490, 495, 497, 502, 508, 510; 296/180.1, 296/180.4; 244/199

See application file for complete search history.

(56) References Cited

U.S. PATENT DOCUMENTS 1,989,733 A 2/1935 Bell
3,861,735 A 1/1975 Taylor
4,068,883 A 1/1978 Meinecke
4,208,197 A 6/1980 Yakimowich
4,343,506 A 8/1982 Saltzman
4,421,354 A 12/1983 Lemaster
4,569,289 A 2/1986 Gielow
5,280,990 A * 1/1994 Rinard ....................... 296/180.1
5,289,997 A 3/1994 Harris
5,311,412 A 5/1994 Yang
5,536,062 A 7/1996 Spears
6,216,644 B1 4/2001 Eroglu
6,286,894 B1 9/2001 Kingham
6,379,410 B1 * 4/2002 Dudley ........................ 55/385.3
6,412,853 B1 7/2002 Richardson
6,561,575 B2 5/2003 Fairburn
6,685,256 B1 2/2004 Shermer
6,712,425 B2 * 3/2004 Brulhart ..................... 296/180.1
6,899,369 B2 5/2005 Neel
6,926,345 B2 * 8/2005 Ortega et al. ............. 296/180.4
7,100,969 B2 * 9/2006 Choi et al. ................ 296/180.1
7,678,168 B2 * 3/2010 Connelly et al. ............. 55/385.3
7,794,011 B2 * 9/2010 Kjellgren et al. .......... 296/180.1
7,950,720 B2 * 5/2011 Skopic ....................... 296/180.1
2005/0040668 A1 2/2005 Wood
2005/0040669 A1 2/2005 Wood
2005/0168012 A1 8/2005 Ortega
2005/0206196 A1 * 9/2005 Ortega et al. ............. 296/180.1
2008/0277966 A1 * 11/2008 Vlahovic ................... 296/180.1
2010/0156142 A1 * 6/2010 Sumitani et al. ........... 296/180.1
2011/0042999 A1 * 2/2011 Dayton ...................... 296/180.4

* cited by examiner

*Primary Examiner* — Duane Smith
*Assistant Examiner* — Minh-Chau Pham
(74) *Attorney, Agent, or Firm* — Christensen O'Connor Johnson Kindness PLLC

(57) ABSTRACT

An air cleaner suitable for use with a heavy-duty vehicle includes a cylindrical body that can be mounted to the vehicle so that the body is exposed to an air stream when the vehicle moves in a forward direction. The air cleaner has a boattail, which includes a fin attached to a rear portion of the body. The fin has a vertical orientation and extends in a substantially rearward direction from the body. When the vehicle moves in a forward direction, the boattail reduces the amount of low-pressure air located behind the air cleaner.

21 Claims, 6 Drawing Sheets

AIR CLEANER BOATTAIL

BACKGROUND

Most heavy-duty vehicles include a powertrain driven by an internal combustion (IC) engine. The air required for combustion is normally collected from outside of the engine compartment through an air intake. In order to minimize the amount of potentially damaging particulates introduced into the engine cylinders, the intake air is passed through an air cleaner that mechanically filters the air before it is discharged into the engine.

While it is feasible in some vehicles to locate the air cleaner in the vehicle's engine compartment, for heavy-duty trucks, such as a Class-8 vehicle, it is advantageous to mount the air cleaner to an external portion of the truck. Mounting the air cleaner to an external portion of the vehicle exposes the air cleaner body, which houses the filter, directly to the air stream. Because the air cleaner body is exposed to the air stream instead of the warm air in the engine compartment, the air discharged from the air cleaner to the engine has a lower temperature. As a result, the air-fuel mixture combusted in the engine has a denser charge, allowing the engine to generate more power.

Although mounting the air cleaner to an external portion of the vehicle increases the charge density of the air-fuel mixture, exposing the air cleaner to the air stream creates drag, thereby reducing the aerodynamic efficiency of the vehicle. Thus, it is desirable to provide an externally mounted air cleaner that creates less drag than currently known air cleaners.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A first embodiment of a disclosed air cleaner is suitable for use with a heavy-duty vehicle. The air cleaner includes a cylindrical body that can be mounted to the vehicle so that the body is exposed to an air stream when the vehicle moves in a forward direction. The air cleaner also has a boattail. The boattail includes a fin attached to a rear portion of the body. The fin has a vertical orientation and extends in a substantially rearward direction from the body. When the vehicle moves in a forward direction, the boattail reduces the amount of low-pressure air located behind the air cleaner.

A second embodiment of a disclosed air cleaner is suitable for use with a heavy-duty vehicle, wherein the vehicle has a cab and a vertical exhaust stack positioned along the side of the cab. The air cleaner has a cylindrical body that can be mounted to the vehicle so that the air cleaner is positioned forward of the exhaust stack. The air cleaner also has a boattail, which includes a fin attached to a rear portion of the body. The fin is vertically oriented and extends in a substantially rearward direction from the body. When the vehicle travels in a forward direction, the boattail reduces the flow of air that impinges the exhaust stack.

A third embodiment of the disclosed air cleaner is suitable for use on a heavy-duty vehicle. The air cleaner has a cylindrical body that can be mounted to the vehicle so that the body is exposed to an air stream when the vehicle moves in a forward direction. The air cleaner also has a boattail, which includes first and second fins that are vertically oriented and extend rearwardly from the body. The first fin is located outboard of a centerline of the body, and the second fin is located inboard of the centerline of the body. When the vehicle moves in a forward direction, the first fin and the second fin reduce the amount of low-pressure air located rearward of the air cleaner.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Embodiments of the disclosed subject matter will now be described with reference to the drawings where like numerals correspond to like elements. Embodiments of the disclosed subject matter are directed to systems and methods for reducing the aerodynamic drag on vehicles. Specifically, embodiments of the disclosed subject matter are directed to systems and methods that reduce aerodynamic drag on vehicles, such as tractor-trailer combinations, having generally cylindrical components mounted to the exterior of the vehicle. Although embodiments of the disclosed subject matter will be described with reference to tractor-trailer combinations and other heavy-duty vehicles, one skilled in the relevant art will appreciate that the systems and methods of the disclosed subject matter have wide application, and may be used in any situation where a reduction in the drag forces on a bluff body is desirable. Accordingly, the following descriptions and illustrations herein should be considered illustrative in nature, and not limiting the scope of the disclosed subject matter as claimed.

Figure 1:
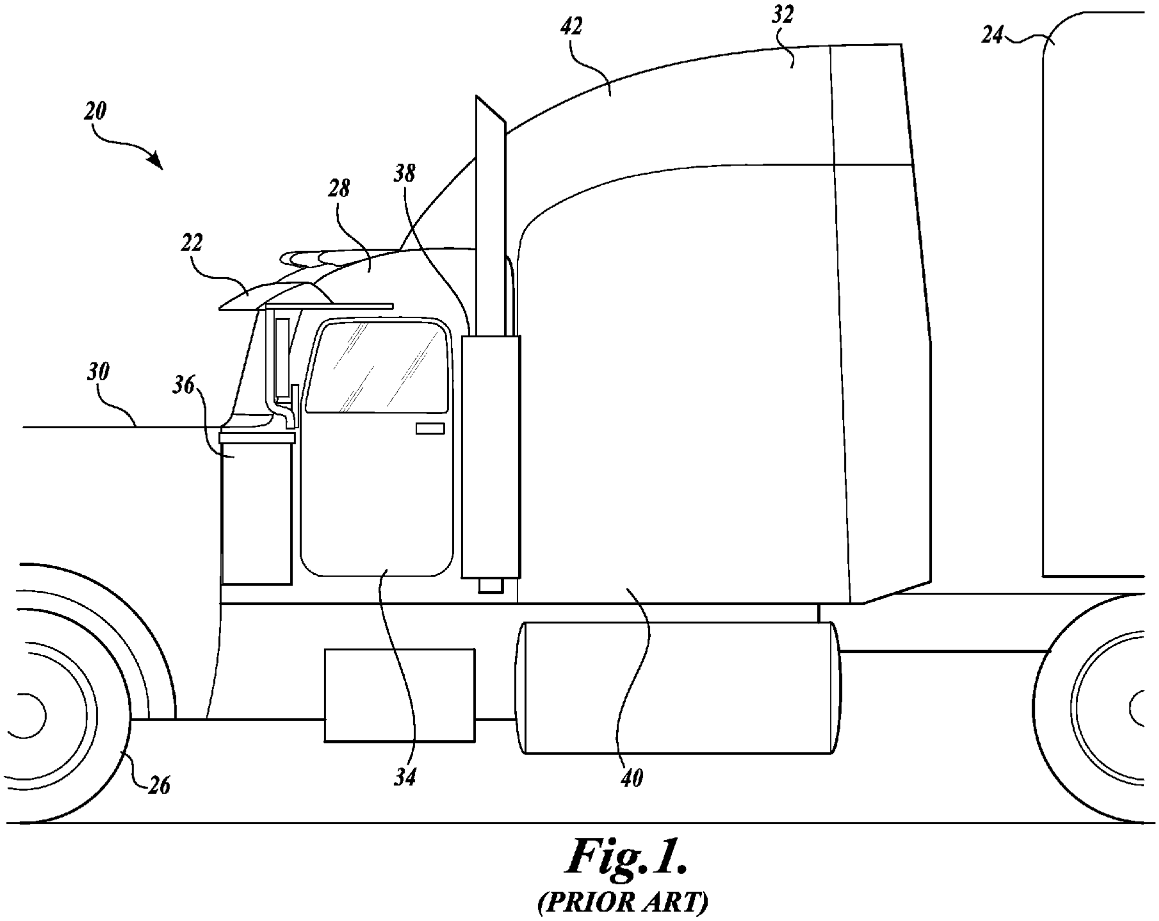
Fig.1. (PRIOR ART)
FIG. 1 shows a side view of a known air cleaner mounted to a heavy-duty vehicle.
Figure 2:
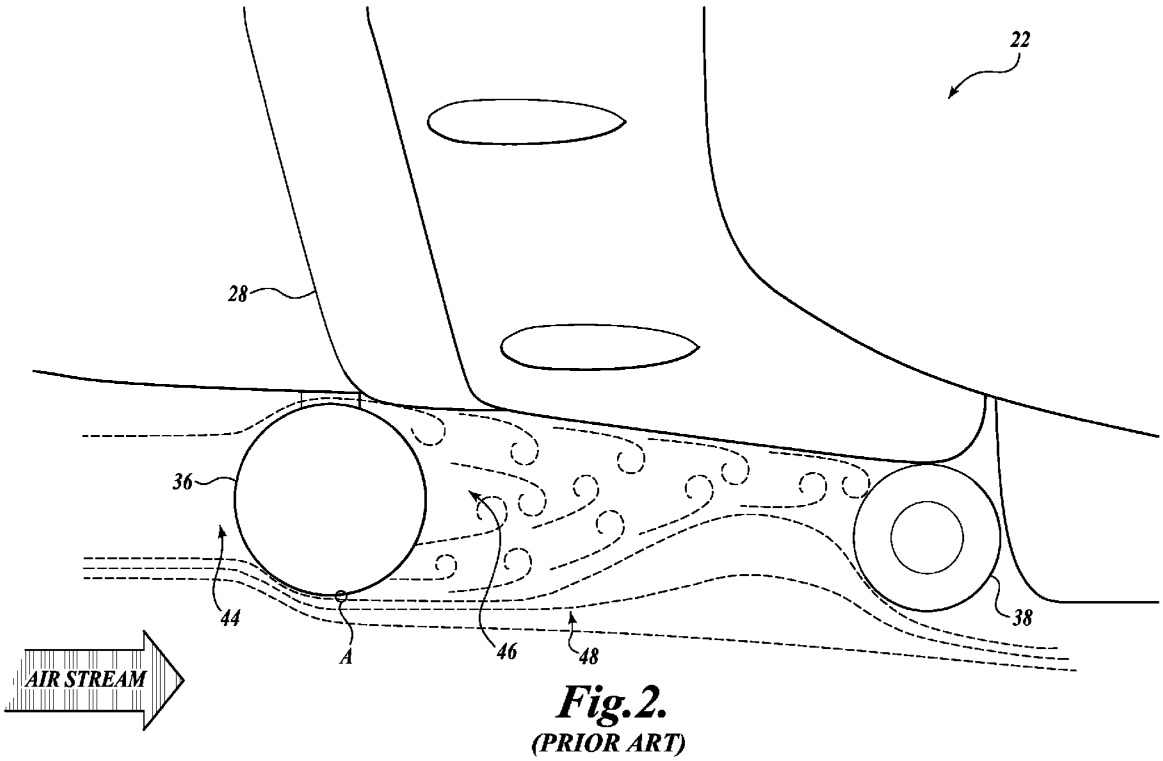
Fig.2. (PRIOR ART)
FIG. 2 shows a top view of the air cleaner shown in FIG. 1.

Turning now to FIGS. 1 and 2, there is shown a portion of a known tractor-trailer combination 20 comprising a tractor 22 that is functionally connected to a trailer 24. The tractor 22 comprises a chassis that is supported by wheels 26 connected thereto via conventional suspension assemblies (not shown). A conventional cab assembly 28 is supportably mounted on the chassis. The cab assembly 28 includes a front end 30 that generally houses an internal combustion engine that propels the combination and a rear end 32. A door 34 is positioned on the side of the cab assembly 28 to allow ingress to and egress from the cab.

As shown, the cab assembly 28 may include an optional sleeper box 40 and various roof fairings 42 if desired, but these features are not required to appreciate the benefits of the disclosed subject matter. Collectively, however, these structures are referred to herein as the cab assembly or cab 28. It will be understood that a myriad of possible combinations and cab shapes can comprise the cab assembly 28. Further, as is known in the art, the tractor 22 may include fairings or cowls (not shown) mounted to the front end 30 of the cab assembly 28 for improving the aerodynamics of the tractor 22, if desired.

The illustrated tractor further includes a substantially cylindrical air cleaner 36 positioned proximal to the side of the cab assembly 28, forward of the door 34. The air cleaner 36 is oriented so that the cylinder is substantially vertical. Also, a vertical exhaust stack 38 is positioned proximal to the side of the cab assembly 28 and extends vertically upward adjacent to the rear of the door 34. While the tractor 22 is shown as a conventional type tractor, aspects of the disclosed subject matter work equally well with cab over engine (COE) type tractor configurations.

Movement of the tractor 22 in a forward direction results in rearward moving air stream relative to the tractor. As shown in FIG. 2, wherein the idealized flow of the air stream is represented by dashed lines, the air stream impinges the leading edge of the air cleaner 36, creating a high-pressure area 44. Most of the air stream that contacts the leading edge of the air cleaner 36 flows rearwardly around the outboard side of the air cleaner. At the same time, a portion of the air stream that contacts the leading side of the air cleaner 36 flows rearwardly between the air cleaner and the side of the cab 28. Because the air cleaner is usually mounted in close proximity to the cab assembly, the volume of air typically flowing between the air cleaner 36 and the cab assembly 28 is considerably less than the amount of air flowing around the outboard side of the air cleaner 36.

Still referring to FIG. 2, the flow of air around the outboard side of the air cleaner 36 tends to be generally laminar when the tractor is traveling at a normal highway speed of approximately 60 miles per hour. Under these conditions, separation of the localized airflow from the air cleaner 36 tends to occur at the outboardmost portion of the air cleaner, illustrated as point A. The laminar airflow continues in a rearward direction aft of the separation point A. At the same time, air inboard and to the rear of the separation point A defines an area 46 of turbulent flow to the rear of the air cleaner 36.

The pressure of the turbulent flow area 46 to the rear of the air cleaner 36 is less than that of the high-pressure area 44 at the leading edge of the air cleaner 36. As a result, a pressure differential exists that creates a pressure drag on the air cleaner 36. In addition, the low-pressure turbulent area 46 draws the laminar flow 48 inboard toward the side of the cab 28. Consequently, as shown in FIG. 2, the amount of laminar flow impinging the leading edge of the exhaust stack 38 is increased. This, in turn, increases the drag on the exhaust stack 38. The added drag on the air cleaner 36 and the exhaust stack 38 combine to decrease the aerodynamic efficiency of the vehicle 22, thereby increasing the fuel consumption.

Figure 3:
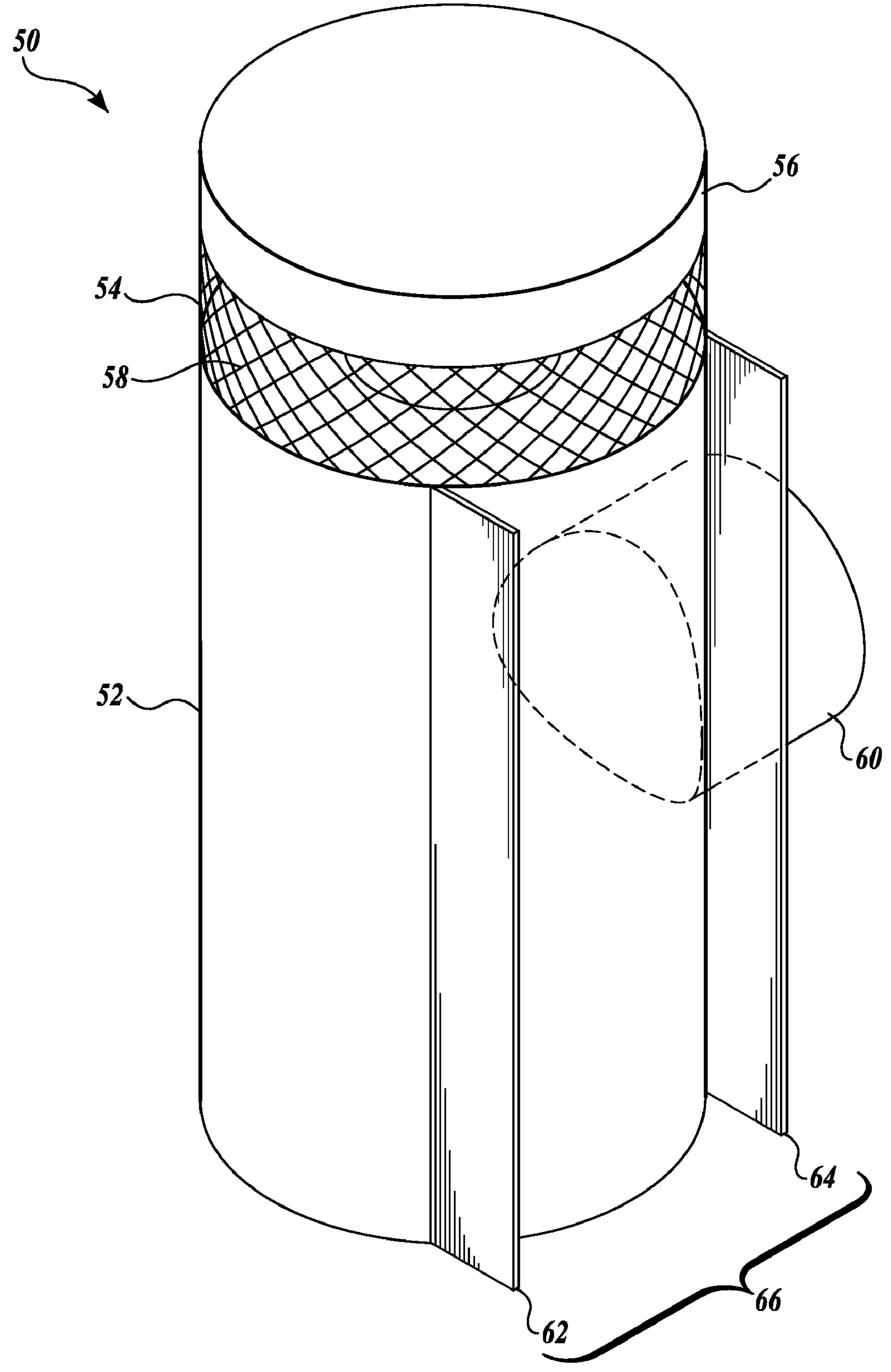
FIG. 3 shows an isometric view of an exemplary embodiment of a disclosed air cleaner having a boattail.

FIG. 3 shows an air cleaner 50 in accordance with one embodiment of the presently disclosed subject matter. The air cleaner 50 is similar to known air cleaners in that it includes a substantially cylindrical body 52, an air intake 54 positioned above the body, and a cap 56 disposed above the air intake. The air intake 54 is covered by a mesh 58 to prevent large particles from entering the air intake. Disposed within the body 52 is an air filter (not shown) that mechanically filters the intake air to remove particles that pass through the mesh. The filtered air is then discharged from a discharge port 60, which extends laterally from the side of the body 52, and is routed to the engine intake. It should be appreciated that the illustrated air cleaner is exemplary and should not be considered limiting. In this respect, other embodiments are contemplated wherein the air cleaners have different shapes, sizes, and have air intakes and discharge ports that are differently located and configured than that of the illustrated air cleaner 50. These and other suitable air cleaners should be considered within the scope of the present disclosure.

Figure 4:
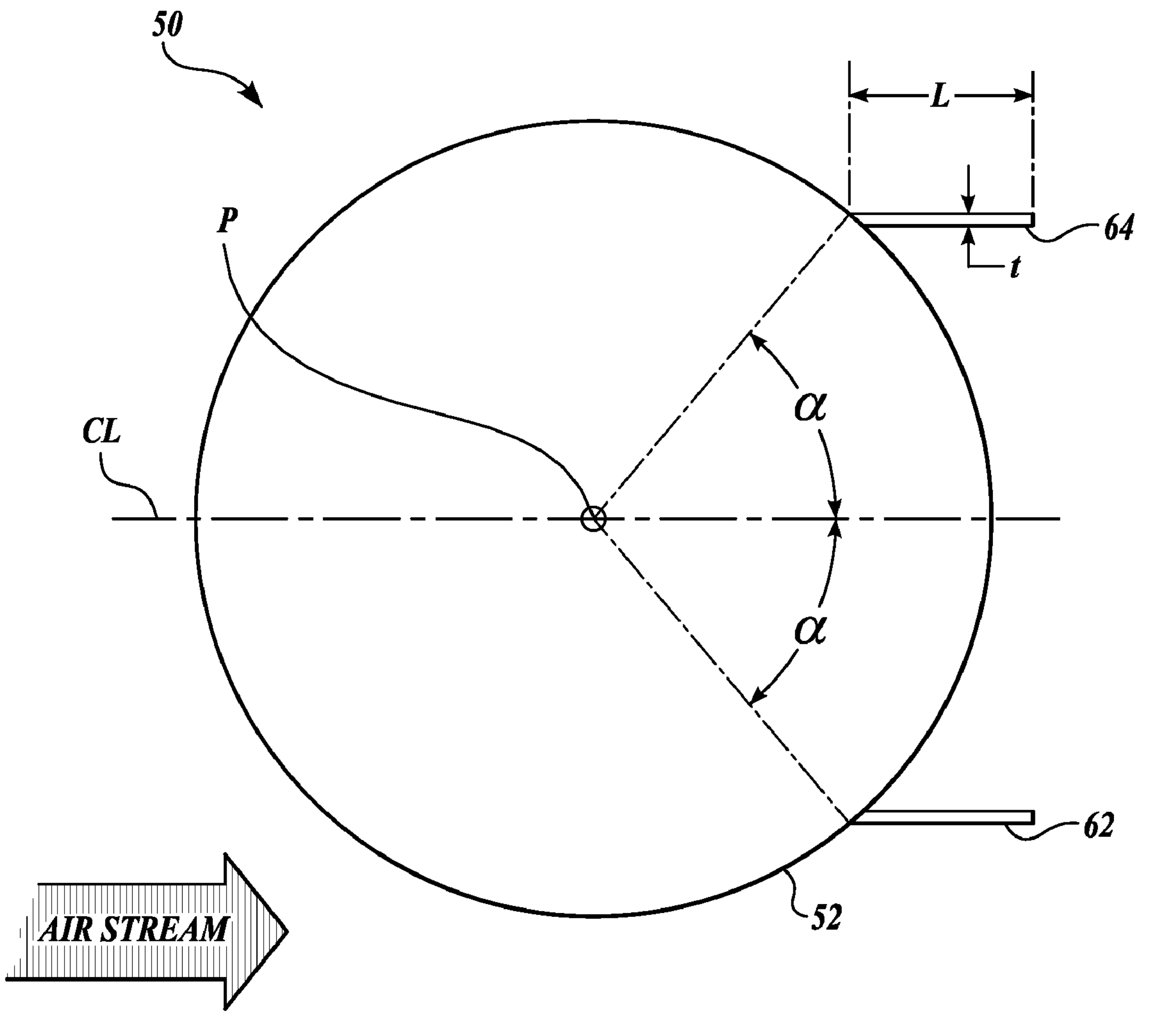
FIG. 4 shows a top view of the air cleaner shown in FIG. 3.

Referring now to FIGS. 3 and 4, the illustrated air cleaner 50 further includes a pair of fins 62 and 64 that define a boattail 66. The fins 62 and 64 are positioned to extend in a rearward direction from the body 52 of the air cleaner 50 when the air cleaner is mounted to vehicle 22. Each fin 62 and 64 extends vertically from the bottom of the air cleaner body 52 to an area just under the air intake 54. The fins 62 and 64 can be attached to the air cleaner body 52 by welding, adhesives, mechanical fasteners, or any other suitable method, depending on the material from which the air cleaner body and the fins are formed. Alternately, the fins 62 and 64 can be integrally formed with the air cleaner body 52.

Figure 5:
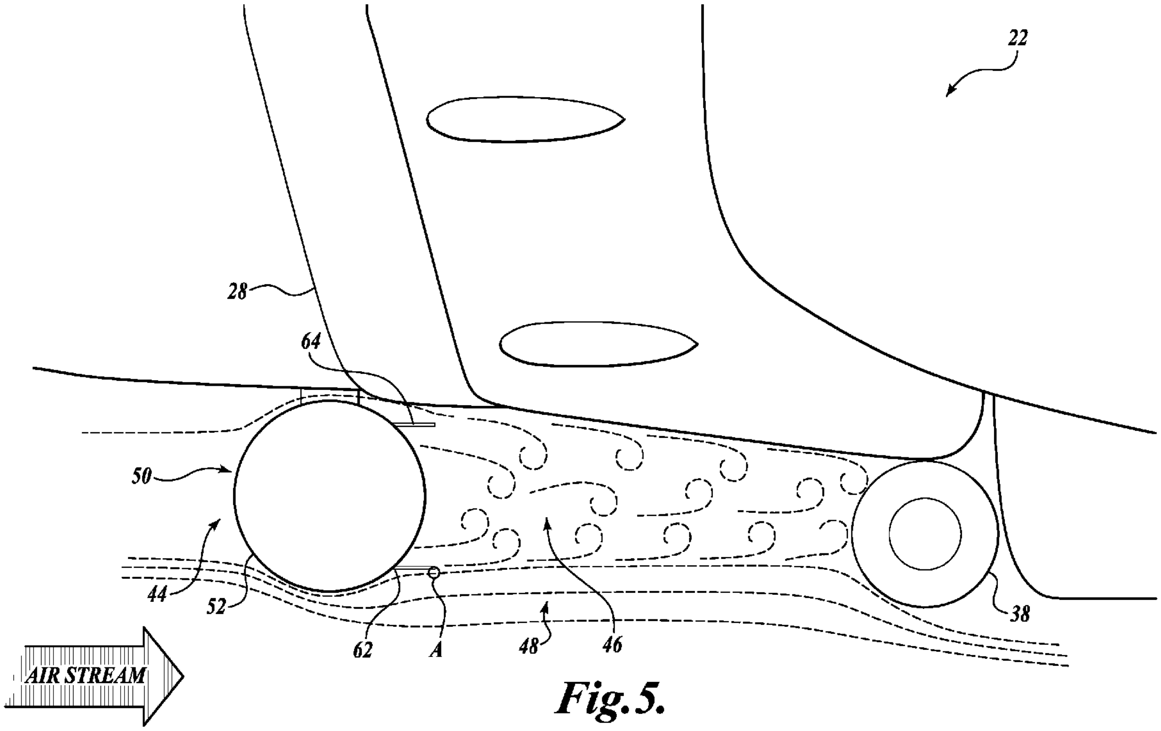
FIG. 5 shows a top view of the air cleaner shown in FIG. 3 mounted to a heavy-duty vehicle.

FIG. 5 shows the air cleaner 50 of FIGS. 3 and 4 mounted to the driver side of a typical tractor 22. Similar to the previously described air cleaner 36 shown in FIG. 2, movement of the tractor 22 in a forward direction causes the air stream to impinge the leading edge of the air cleaner 50, creating a high-pressure area 44 forward of the air cleaner 50. The generally laminar air 48 that flows around the air cleaner 50 separates from the air cleaner at separation point A near the rear tip of the boattail 66, i.e., the fins 62 and 64. Because the separation point A is inboard of the separation point A shown in FIG. 2, the turbulent low-pressure area 46 to the rear of the air cleaner 50 is narrower, and the total air pressure behind the air cleaner is increased. Consequently, the pressure drag resulting from the difference between the pressures forward and to the rear of the air cleaner 50 is reduced, thereby reducing overall drag on the vehicle. In addition, because the pressure in the area behind the air cleaner 50 with a boattail 66 is higher than behind a similar air cleaner 36 without a boattail, the laminar flow 48 that bounds the turbulent low-pressure area 46 is not drawn toward the cab to the degree that it is when the air cleaner has no boattail. As a result, less of the laminar flow 48 directly impinges the leading edge of the exhaust stack 38, further reducing drag and increasing the overall aerodynamic efficiency of the vehicle.

Referring back to FIG. 4, each of the disclosed fins 62 and 64 in one embodiment has a substantially rectangular cross section having a length "L" and a thickness "t." In one example, it has been determined that for a 130 mm diameter air cleaner mounted to a Class 8 tractor traveling at 60 miles per hour, the preferred length L of the fins 62 and 64 is at least 50 mm to 75 mm, although a length L of as little as 2 mm has been found to provide a measurable benefit. The length L of the fins 62 and 64 is preferably determined by the aerodynamic characteristics of the air cleaner body 52 and of the vehicle 22, and it will be apparent to one of skill in the art that the length L can be adjusted to provide optimal benefit to a particular vehicle/air cleaner combination.

The thickness t of the fins 62 and 64 is sufficient to provide suitable stiffness such that the fins do not flex or vibrate excessively during normal operating conditions. Because the stiffness depends upon such factors as the materials used to form the fins and the cross-sectional shape of the fins, the preferred thickness for different fins will vary. Further, although the illustrated fins have substantially rectangular cross section, it should be appreciated that other cross-sectional shapes are possible. In one alternate embodiment, the corners of the trailing edge have a radius or chamfer defining a transition from each side of the fin to the rear surface of the fin. In another embodiment, the trailing edge of the fin is a full radius connecting the inboard side of the fin to the outboard side of the fin. In yet another embodiment, the thickness of the fin tapers from a thicker base portion at the leading edge of the fin to a thinner portion at the trailing edge of the fin. Additional stiffness can also be achieved with the inclusion of side braces or other suitable support structure. These and other variations are contemplated and should be considered within the scope of the present disclosure.

Referring now to FIG. 4, the placement of the fins 62 and 64 on the air cleaner body 52 has been determined to impact the effectiveness of the boattail 66. For the purpose of the following discussion, the centerline CL of the air cleaner 50 is defined viewing the air cleaner 50 from above, wherein the centerline CL is a line parallel to the air stream (when the vehicle is moving forward) that passes through the center point P of the generally circular cross section of the air cleaner body 52. In the embodiment shown in FIG. 4, the fins 62 and 64 are offset by equal amounts from the centerline CL of the air cleaner as viewed from above. Each fin is placed such that a line defined by the center point P and the attachment point of the fin forms an angle α with the centerline of the air cleaner. It will be appreciated that the optimal value of the angle α can vary according to the aerodynamic characteristics of the air cleaner 50 and the vehicle 22, as well as other factors. In this regard, the value of the angle α can vary from 0° to approximately 90°. It will also be appreciated that the inboard and outboard fins need not be located an equal distance from the centerline CL. Embodiments are contemplated wherein the inboard fin 64 is positioned further from the centerline CL than the outboard fin 62 and, alternatively, wherein the outboard fin 62 is positioned further from the centerline CL than the inboard fin 64.

Testing has been conducted to determine the impact of placement of the fins on the aerodynamic efficiency of the air cleaner. In one tested embodiment, rectangular fins having a length of 20 mm and a width of 2 mm were used in conjunction with an air cleaner having a diameter of 130 mm. It was determined that when such a configuration is subjected to a 60 mile per hour air stream, similar to what would be experienced under normal highway operating conditions, the impact of the boattail 66 on drag reduction is optimized when the fins 62 and 64 are positioned such that the value of α is less than approximately 70°, with optimal drag reduction being achieved when the angle α is approximately equal to 50°.

Other variations to the construction of the fins 62 and 64 are contemplated and will depend in part on the material from which the boattails are formed, the desired stiffness of the boattail, weight and manufacturing considerations, and a variety of other variables. In addition, the length, profile, cross-sectional shape, and placement of the fins 62 and 64 can vary from the illustrated embodiment based on the configuration of the air cleaner 50, the aerodynamic properties of the air cleaner body 52, and the vehicle 22 to which the air cleaner 50 is mounted, etc. For example, a particular fin may not extend vertically along the entire vertical length of the air cleaner but may instead have upper and lower ends that are offset from the upper and lower ends, respectively, of the air cleaner. Further, the shape of the fins when viewed from the side need not be rectangular, as shown in FIG. 3, but can instead be triangular, trapezoidal, or any other suitable shape. Alternately, the fins can have a trailing edge defined by a simple or complex curve. These and other suitable variations in the boattail configuration are contemplated and should be considered within the scope of the present disclosure.

Figure 6:
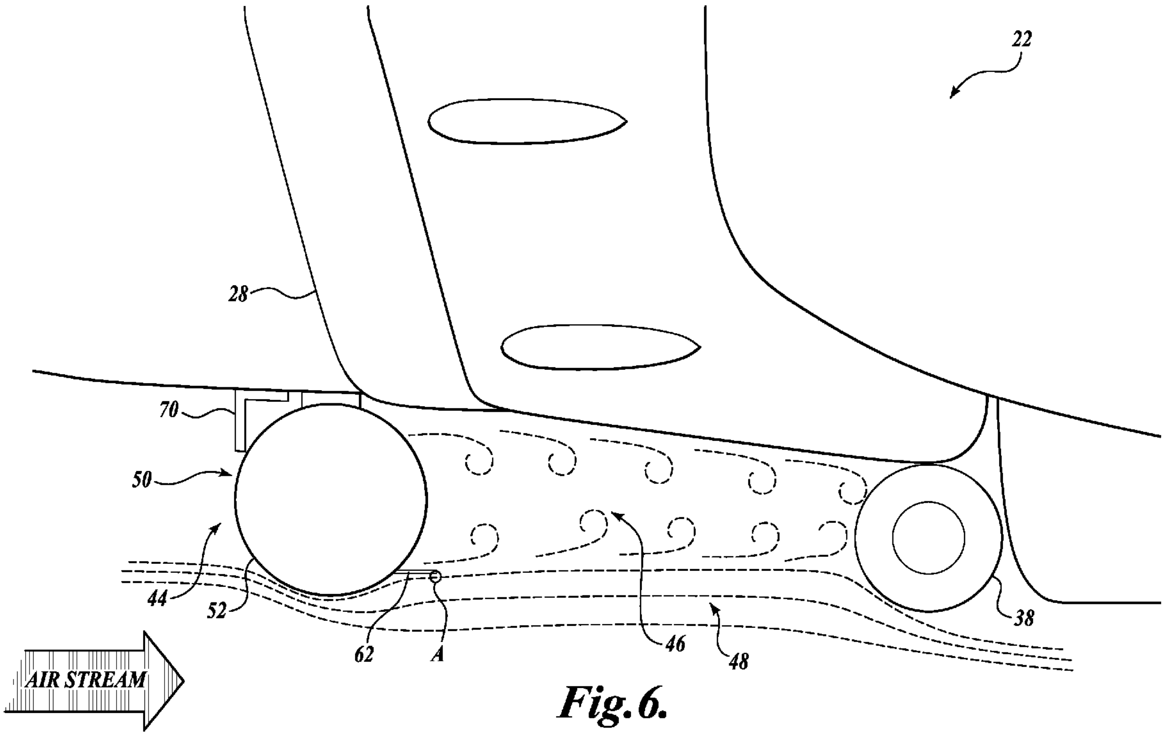
FIG. 6 shows a top view of a second exemplary embodiment of a disclosed air cleaner having a boattail.

FIG. 6 shows a second embodiment of an air cleaner 50 having a boattail 66. The air cleaner 50 is similar to that shown in FIGS. 3-5, except that boattail 66 includes a single fin 62 positioned outboard of the centerline CL of the air cleaner body 52. Unlike the embodiment of FIG. 5, the air cleaner 50 of FIG. 6 does not include an inboard fin 64. Instead, an optional air cleaner light bar 70 or other structure is mounted between the air cleaner body 52 and the side of the cab 28 to block at least a portion of the air stream that would otherwise flow between the air cleaner 50 and the side of the cab. The reduction in the amount of air flowing between the air cleaner body and the side of the cab mitigates any increase in drag due to the omission of an inboard fin.

It will be appreciated that illustrated air cleaner 50 need not be mounted in conjunction with a light bar 70. In this respect, a fairing or any other structure that reduces the flow of air between the air cleaner 50 and the cab 28 will be effective in mitigating any increase in drag resulting from the single fin configuration. Further, because the volume of air flowing between the air cleaner body and the cab is significantly less than the volume of air flowing around the outboard side of the air cleaner, a single fin configuration can be effectively utilized without a light bar 70 or any other structure intended to decrease the airflow between the air cleaner body and the side of the cab.

Similar to the two-fin boattail shown in FIG. 5, the single-fin boattail shown in FIG. 6 decreases drag on the vehicle. As air flows around the outboard side of the air cleaner body 52, the fin 62 moves the separation point A of the laminar flow rearward and inboard. As a result, the amount of low-pressure turbulent flow 46 behind the air cleaner 50 is reduced, which in turn reduces the amount of pressure drag on the air cleaner. Further, because the low-pressure area 46 is reduced, the laminar flow 48 outboard of the air cleaner 50 is not drawn into the area between the air cleaner 50 and the exhaust stack 38 to as great a degree, and the additional drag caused by air impinging the leading edge of the exhaust stack is also reduced.

While illustrative embodiments have been illustrated and described, it will be appreciated that various changes can be made therein without departing from the spirit and scope of the invention. For example, although the disclosed air cleaner is described with respect to a tractor-trailer combination and Class 8 trucks, it should be appreciated that the air filter is suitable for use with any heavy-duty vehicle having an externally mounted air cleaner. In addition, the air cleaner need not be mounted to the vehicle forward of an exhaust stack. Also, while the air cleaner is illustrated as being mounted to the driver side of the vehicle, the disclosed air cleaner is equally suitable for mounting on the passenger side of the vehicle. These and other embodiments of the disclosed air cleaner are contemplated and should be considered within the scope of the disclosed subject matter as claimed. Accordingly, it should be appreciated the that disclosed embodiments are exemplary and should not be considered limiting.

The invention claimed is:

1. An air cleaner for a heavy-duty vehicle, the air cleaner comprising:

(a) a cylindrical body vertically mountable to the vehicle to be exposed to an air stream when the vehicle moves in a forward direction; and (b) a boattail comprising a vertically oriented fin extending in a substantially rearward direction from a rear portion of the body, wherein the boattail reduces an amount of low pressure air located rearward of the air cleaner when the vehicle moves in a forward direction.

2. The air cleaner of claim 1, wherein the fin has a substantially rectangular shape.

3. The air cleaner of claim 1, wherein the body has a diameter of approximately 130 mm and the fin has a length of at least 50 mm.

4. The air cleaner of claim 3, wherein the length of the fin is at least 75 mm.

5. The air cleaner of claim 1, wherein a centerline of the body and a line extending from a center point of the body to the fin define an angle having a value between 0° and 70°.

6. The air cleaner of claim 5, wherein the value of the angle is approximately 50°.

7. The air cleaner of claim 1, wherein the fin is positioned outboard of a centerline of the body.

8. The air cleaner of claim 7, the boattail further comprising a second vertically oriented fin extending in a substantially rearward direction from the rear portion of the body, the second fin being positioned inboard of the centerline of the body.

9. An air cleaner for a heavy-duty vehicle, the vehicle having a cab and a vertical exhaust stack located proximate to a side of the cab, the air cleaner comprising:

(a) a cylindrical body vertically mountable to the vehicle forward of the exhaust stack; and (b) a boattail comprising a fin attached to a rear portion of the body, the fin being vertically oriented and extending in a substantially rearward direction from the body, wherein the boattail reduces a flow of air that impinges the exhaust stack when the vehicle is traveling in a forward direction.

10. The air cleaner of claim 9, wherein the fin has a substantially rectangular shape.

11. The air cleaner of claim 9, wherein the body has a diameter of approximately 130 mm and the fin has a length of at least 50 mm.

12. The air cleaner of claim 11, wherein the length of the fin is at least 75 mm.

13. The air cleaner of claim 9, wherein a centerline of the body and a line extending from a center point of the body to the fin define an angle having a value between 0° and 70°.

14. The air cleaner of claim 13, wherein the value of the angle is approximately 50°.

15. The air cleaner of claim 9, wherein the fin is positioned outboard of a centerline of the body.

16. The air cleaner of claim 15, the boattail further comprising a second fin, the second fin being vertically oriented and extending in a substantially rearward direction from the body, the second fin being positioned inboard of the centerline of the body.

17. An air cleaner for a heavy-duty vehicle, the air cleaner comprising:

(a) a cylindrical body mountable to the vehicle to be exposed to an air stream when the vehicle moves in a forward direction; and (b) a boattail comprising:

(i) a first fin extending rearwardly from the body, the fin being vertically oriented and located outboard of a centerline of the body; and (ii) a second fin extending rearwardly from the body, the second fin being vertically oriented and located inboard of the centerline of the body, wherein the first fin and the second fin reduce an amount of low-pressure air located rearward of the air cleaner when the vehicle moves in a forward direction.

18. The air cleaner of claim 17, wherein the first fin has a first length and the second fin has a second length, the first length being approximately equal to the second length.

19. The air cleaner of claim 17, wherein the first fin has a first length and the second fin has a second length, the first length being greater than the second length.

20. The air cleaner of claim 17, wherein the first fin is positioned a first distance from the centerline of the body, and the second fin is positioned a second distance from the centerline of the body, wherein the first distance is approximately equal to the second distance.

21. The air cleaner of claim 1, wherein the first fin extends away from a surface of the cylindrical body in a substantially rearward direction that is parallel to the forward direction of the vehicle.

* * * * *